July 24, 1962         H. P. KALMUS         3,046,549
SHORT RANGE TRACKING SYSTEM
Filed Aug. 7, 1959
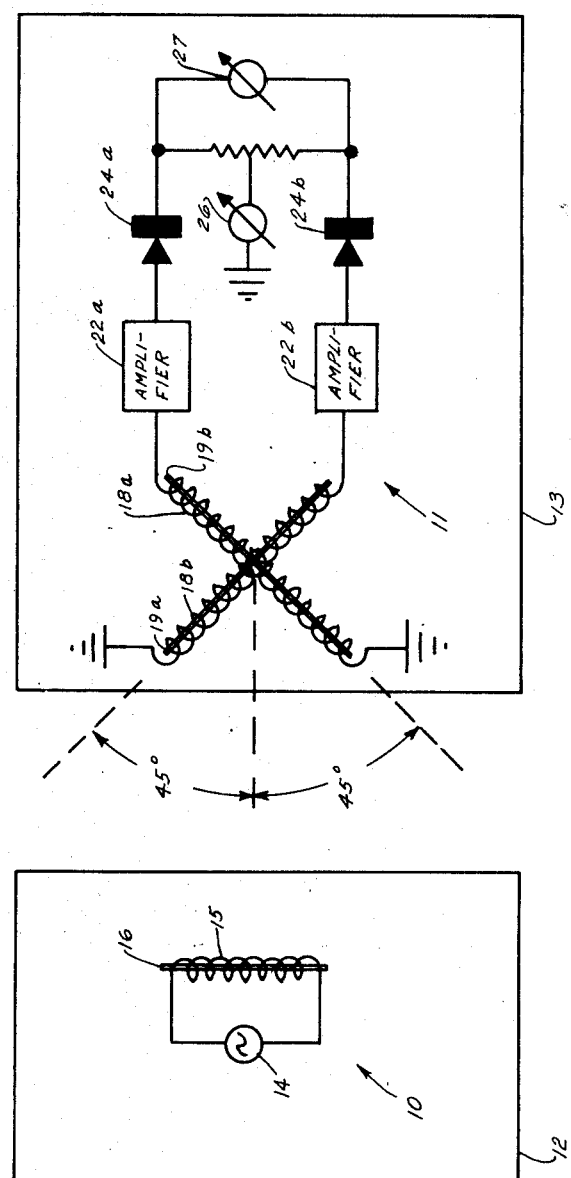
INVENTOR
HENRY P. KALMUS

3,046,549
SHORT RANGE TRACKING SYSTEM
Henry P. Kalmus, 3000 University Terrace NW.,
Washington, D.C.
Filed Aug. 7, 1959, Ser. No. 832,413
2 Claims. (Cl. 343—113)
(Granted under Title 35, U.S. Code (1952), sec. 266)

The invention described herein may be manufactured and used by or for the Government for governmental purposes without the payment to me of any royalty thereon.

This invention relates generally to a short range tracking system suitable for use with military truck convoys and the like. More specifically, this invention allows a "follower" to accurately determine the direction of movement of a "leader" and also the distance between the "leader" and "follower."

In conventional tracking systems used in military truck convoys and the like, a "follower" vehicle usually keeps informed of the distance and direction of the "leader" vehicle (the vehicle immediately ahead of the "follower") by visual observation or by radio signals. At night, the follower may watch lights on the rear of the leader. Among the disadvantages of using light waves for information is that dust, dirt or fog may obscure the source of light from the "leader." A main disadvantage of radio waves is that the field strength decreases rather slowly with distance (field strength is proportional to the inverse power of distance), so that radiation from one vehicle will extend in substantial strength to many other vehicles in the convoy instead of just to the vehicle immediately behind. Furthermore, in military convoys, both radio and light waves involve risks of detection of the convoy by the enemy.

A principal object of the present invention is to provide a simple, dependable, economical tracking system for use by military convoys and the like, which system should avoid the disadvantages associated with the use of light or radio waves.

In a preferred form of the invention, a transmitter coil is mounted fixedly on a leader vehicle. The axis of the transmitter coil is parallel to the earth and at right angles to the normal straight-line direction of motion of the vehicle. This coil is energized at a frequency of, for example, 40 kilocycles, giving rise to an induction field the strength of which decays with the fourth power of distance. A pair of similar coils are mounted fixedly on the follower vehicle; these two coils are at right angles to each other in a horizontal plane, and each coil makes a 45-degree angle with the normal straight-line direction of motion of the follower vehicle. The signals induced in each of these two coils are rectified separately. The two rectified signals are added and subtracted by conventional circuitry. The sum of the two signals is a measure of the distance of the follower from the leader. When the leader and follower vehicles are travelling along the same straight-line path the difference between the two signals is zero; if the leader vehicle changes direction the resulting change in the difference between the two signals immediately indicates the change in direction.

The specific nature of the invention, as well as other objects, uses, and advantages thereof, will clearly appear from the following description and from the accompanying drawing, in which:

The drawing shows schematically a system in accordance with the invention, comprising a transmitter mounted on a first mobile unit, or leader, and a receiving system mounted on a second mobile unit, or follower.

In the drawing, blocks 12 and 13 represent leader and follower vehicles, respectively, that are intended to normally move one behind the other along a straight line course in the direction represented by the arrow C. A transmitter 10 is mounted fixedly on leader 12, and a receiver 11 is mounted fixedly on follower 13.

Transmitter 10 consists of a source 14 of alternating current which energizes a coil 15 wound on a ferrite rod 16. Very little power is required for practical purposes, and source 14 is preferably a transistor oscillator. The frequency is not critical, but 40 kilocycles has been found satisfactory. Coil 15 is mounted horizontally, at right angles to the normal direction of motion of leader 12. Coil 15 is mounted at a rear center position on leader 12. Coil 15 produces an induction field the strength of which is inversely proportional to the fourth power of distance.

Receiver 11, which is responsive to the induction field of coil 15, senses this field by means of identical coils 17 and 18, which are wound on ferrite rods 19 and 20, respectively. Coils 17 and 18 are mounted fixedly on follower 13, in a front center position with respect to follower 13. These coils are at right angles to each other, with their centers in close proximity to each other.

When follower 13 is close enough behind leader 12, the induction field produced by coil 15 on leader 12 gives rise to output signals from coils 17 and 18 on follower 13. These output signals are amplified by identical amplifiers 22a and 22b and rectified by identical rectifiers 24a and 24b. Meters 26 and 27 are connected to measure the sum and difference, respectively, of the output voltages of rectifiers 24a and 24b. Such sum and difference circuits are well known.

From what has been said it will be understood by those skilled in the art that the voltages induced in each of coils 17 and 18, and thus the output voltages of rectifiers 24a and 24b, will depend both on the distance of coil 15 from coils 17 and 18 and on the orientation of coil 15 with respect to coils 17 and 18. When the two vehicles are following the same straight-line course, each of coils 17 and 18 will be at an angle of 45 degrees to coil 15, and the voltages induced in coils 17 and 18 will therefore be equal and of an amplitude dependent upon the distance between the two vehicles.

If leader 12 turns, coil 15 will no longer be symmetrically oriented with respect to coils 17 and 18; the voltage induced in one of coils 17 and 18 will therefore increase, while the voltage induced in the other will decrease, and meter 27 will give an indication of both the angle and direction (left or right) of the turn made by leader 12.

It can be shown theoretically and experimentally that the sum voltage applied to meter 26 is only slightly dependent on the angle that coil 15 makes with coils 17 and 18; meter 26 gives a good practical measure of the distance of follower 13 from leader 12, and this measure is only slightly affected by turns made by leader 12.

For the convenience of the operator of follower 13, the voltages applied to meters 26 and 27 may be applied to various well-known types of visual or aural indicators. For example, persons skilled in the are will have no difficulty in using these two voltages to control the frequencies of audio oscillators in an arrangement such that musical tones heard by the operator of follower 13 will tell him whether he is at the proper distance from leader 12, and also whether leader 12 is moving straight ahead or is turning to the left or right, and how sharply. These two voltages could also be used to operate the well-known "A–N" system used in aircraft navigation, in which the pilot hears a "dot-dash-dot-dash" series if he veers to one side of the true course and a "dash-dot-dash-dot" series if the veers to the other.

It will be apparent that the embodiment shown is only exemplary and that various modifications can be made in construction and arrangement within the scope of the invention as defined in the appended claims.

I claim as my invention:

1. A short range tracking system for use in leader-follower vehicle arrangement wherein the follower vehicle is to follow movement of the leader vehicle, said system comprising, a transmitter mounted in said leader vehicle and adapted to produce an induction field, a receiver mounted in said follower vehicle, said receiver comprising a pair of identical coils surrounding identical ferrite rods, said rods being orthogonally positioned with respect to each other, said coils producing output voltages which are equal only when said receiver is oriented with respect to said transmitter with said follower vehicle aligned behind said leader vehicle, amplifying and rectifying means connected to the output of each coil, and means connected to said rectifying means for obtaining the difference between the output voltages of said coils to indicate the movement of said leader vehicle with respect to said follower vehicle.

2. A short range tracking system for use in a leader vehicle-follower vehicle arrangement wherein the follower vehicle is to follow movements of the leader vehicle, said system comprising: a coil, a ferrite rod in said coil, and a source of alternating current connected to said coil, said coil being horizontally mounted in said leader vehicle and positioned perpendicularly to the normal direction of motion thereof, said receiver comprising: a pair of identical coils wound upon identical ferrite rods, said identical coils being horizontally mounted in said follower vehicle and orthogonally positioned with respect to each other with their centers intersecting, said identical coils producing equal output voltages due to the induction field from said transmitter whenever said follower vehicle is properly aligned behind said leader vehicle, amplifier means for amplifying said output voltages, identical rectifiers connected to the outputs of said amplifier means for detecting said output voltages after amplification, means connected to said rectifiers for adding said detected voltages to indicate the distance of the follower vehicle from the leader vehicle, and means connected to said rectifiers for subtracting said detected voltages to measure changes in direction by said leader vehicle with respect to the direction of said follower vehicle.

References Cited in the file of this patent

UNITED STATES PATENTS

| | | |
|---|---|---|
| 2,428,360 | Dingley | Oct. 7, 1947 |
| 2,955,778 | Beveridge | Oct. 11, 1960 |

FOREIGN PATENTS

| | | |
|---|---|---|
| 21,610 | Great Britain | Sept. 23, 1913 |